Figure 1:
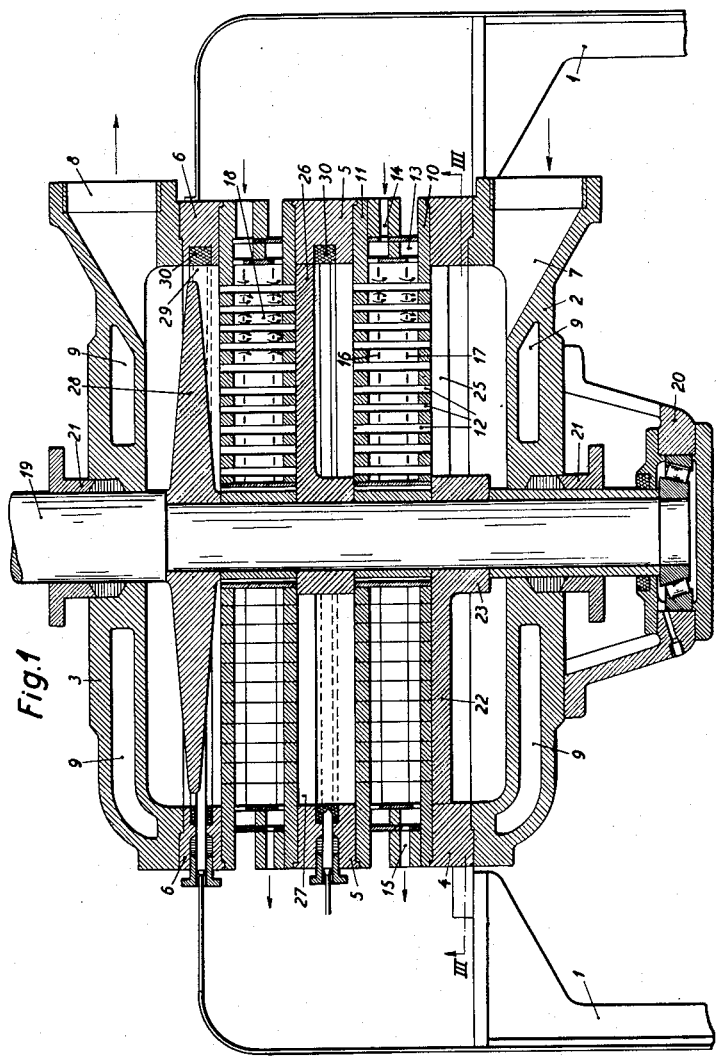

Nov. 29, 1955   A. HANSEN   2,725,217
APPARATUS FOR TEMPERING CHOCOLATE AND SIMILAR MASSES
Filed Nov. 17, 1953   2 Sheets-Sheet 1

Nov. 29, 1955  A. HANSEN  2,725,217
APPARATUS FOR TEMPERING CHOCOLATE AND SIMILAR MASSES

Filed Nov. 17, 1953  2 Sheets-Sheet 2

2,725,217

APPARATUS FOR TEMPERING CHOCOLATE AND SIMILAR MASSES

Asgar Hansen, Herlev, Denmark, assignor to Mikrovaerk A/S, Soborg, Denmark

Application November 17, 1953, Serial No. 392,706

Claims priority, application Denmark November 27, 1952

2 Claims. (Cl. 257—4)

For the continuous tempering of chocolate a series of apparatuses are known, the main elements of which are a case, through the wall of which water or some other liquid of a suitable temperature can flow, and a rotary drum which is enclosed by the case and is provided with one or more screw-thread-like projections on its surface facing the wall of the case. During the rotation of the drum, the screw-thread-like members force the mass forward in the substantially slot-shaped space between the inside of the case and the outside of the drum, and hereby the mass is subjected to a heating or a cooling. In order that a uniform tempering may be attained it is of importance that the thickness of said slot-shaped space is made as small as practically possible. Hereby the capacity of the apparatus will, however, be reduced, and due to the higher back-pressure against the advance of the mass the apparatus will require a rather high driving power.

The purpose of the present invention is to provide a tempering apparatus which has an exceptionally high capacity in relation to the outer dimensions of the apparatus and which yields a substantially smaller resistance against the advance of the mass than is the case in the above-mentioned apparatuses intended for the same work.

More particularly the invention relates to an apparatus for tempering chocolate and similar masses wherein a number of narrow passages are provided in which the mass can be subjected to a variation in temperature, said narrow passages being formed by one or more groups of comparatively short tubes or tubular channels surrounded by a cooling or heating medium space, which is closed against the path of the mass, means being provided for imparting to the mass a step-wise or pulsating motion through said tubes. On account of this step-wise or pulsating motion each mass part or particle need only flow through a path of a very limited length in order to receive the variation in temperature desired, as a very substantial part of said varation in temperature may take place while the mass is stationary inside a tube. The apparatus may thus have a far smaller extent in the flow direction of the mass than the tempering apparatuses hitherto known, and at the same time the cross-section of the apparatus may be considerably limited, since it is possible to have the tubes distributed over practically speaking the whole of this cross-section, so that the tempering proper is not limited to a narrow annular zone as in the case with the known drum apparatuses. A further advantage of the apparatus in accordance with the invention is that the mass being tempered will cause only rather low frictional forces as compared with the known drum apparatuses in which the mass forms a thin layer between the stationary case and the rotary drum.

In order that a blocking of the tubes may be avoided, the latter may expediently have a passage cross-section increasing in the direction of the flow. The tubes may for example be conical.

In an advantageous embodiment, the apparatus has, reckoned in the flow direction of the mass, first at least one tube group extending through a space for a cooling medium, and next at least one tube group extending through a space for a heating medium. By the application of such an apparatus it is possible to give the mass a certain rise in temperature at the termination of the tempering, which has proved advantageous for the further treatment of the chocolate mass.

The tube group or tube groups may be enclosed in a case which furthermore for each tube group contains a partition which is movable in relation to the tube group transversely to the direction of the tubes and at any moment during the operation of the apparatus blocks one end of some of the tubes of the group. In other words, the movable partition serves for providing the pulsating motion of the mass through the tubes when the mass is supplied to the apparatus as a more or less uniform flow.

The partition is advantageously formed by a plate which is mounted on the downstream side of the tube group for rotation around an axis parallel to the longitudinal direction of the tubes and is provided with at least one sector-shaped opening through which the mass can flow away from the tubes of the group. When the plate is mounted on this downstream side of the tube group, the mass will exert an axial pressure on the plate in the direction away from the tube ends, and the frictional forces will thereby be kept at a minimum. The plate may be secured to a rotary shaft which is mounted centrally in the case and which furthermore carries a scraper or a similar member for forcing the mass leaving the tube group past a temperature feeler for the purpose of yielding pulses for the control of the temperature of the medium in the space in which the particular tube group is mounted.

Figure 2:
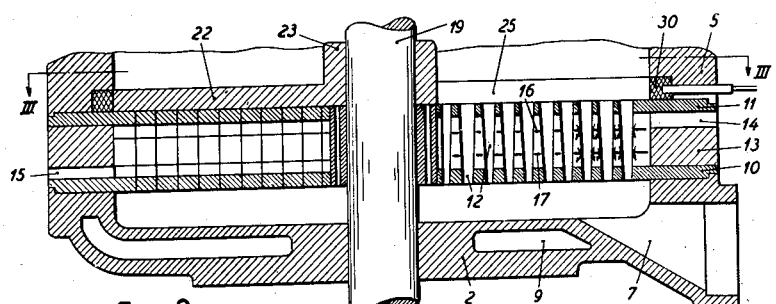
Figure 3:
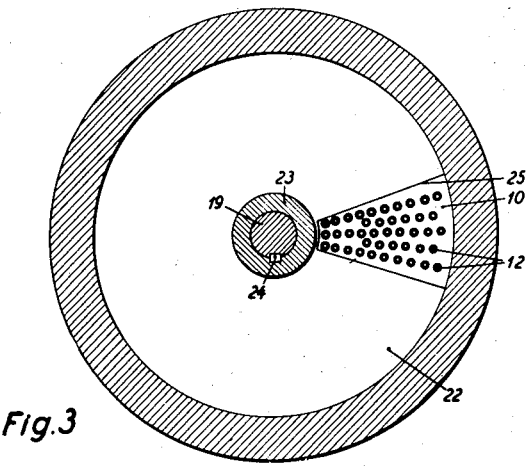

Further details and advantages of the invention will appear from the following description with reference to the drawings, on which Fig. 1 shows a vertical section through a first embodiment of the new tempering apparatus, Fig. 2 a similar picture of part of another embodiment, and Fig. 3 a section along the line III—III in Fig. 1 or 2 on a smaller scale.

1 in Fig. 1 designates parts of a framing carrying the bottom 2 of the case of the tempering apparatus shown. Said case furthermore consists of a cover 3 and some rings 4, 5 and 6 forming the circumferential wall of the case. The bottom 2 and the cover 3 have an inlet 7 and an outlet 8, respectively, for the mass to be tempered and are provided with cavities 9 through which water or some other liquid of a suitable temperature may flow.

The lowest ring 4 forms a tight seal against an upright edge on the bottom 2, and between this ring and the next ring 5 a heat exchange element is inserted consisting of two spaced plates 10 and 11 in which a considerable number of vertical thin-walled tubes 12, e. g. of copper, are secured, the mouths of said tubes being flush with the under side of the plate 10 and the upper side of the plate 11, respectively. Between the outer edge portions of these plates 10 and 11 a circumferential wall 13 is placed which in the embodiment shown is provided with a cavity to which liquid, e. g. water, of a suitable temperature can be supplied through an inlet 14 which furthermore leads into the space through which the tubes 12 extend. 15 is an outlet from this space and from the cavity in the wall 13. At the level of or slightly below the lower edge of the inlet 14 there is in said space mounted a plate 16 for distributing the inflowing liquid over the full cross-section of the space. Each of the tubes 12 passes through a hole in the plate 16, and these holes are of such a size that around each tube a narrow slot is left for the passage of the liquid as indicated with arrows. Hereby a particularly good utilization of the cooling or heating liquid supplied is ensured, the latter being made to ripple down over the outer surface of the tubes 12. A similar perforated plate 17 may, as shown, be mounted some distance below the plate 16 for the same purpose.

Between the ring 5 and the ring 6, which latter ring is connected with the cover 3, a similar heat exchange element 18 is inserted which need not be described in detail.

A vertical rotary shaft 19 is mounted centrally in the case of the apparatus. At its lower end this shaft is carried by a footstep bearing 20 secured to the underside of the bottom 2. This bottom and the cover 3 are provided with stuffing boxes 21 for the shaft 19. A plate 22 with a central boss 23 is, by means of a key 24, secured to the shaft 19 in such a position that its upper side lies immediately below the underside of the plate 10. The plate 22 thus covers the lower ends of the tubes 12, but, as can best be seen from Fig. 3, the plate is provided with a sector-shaped cut or opening 25 which during the rotation of the plate successively uncovers the ends of the tubes 12. A similar plate 26 with a cut or opening 27 is secured to the shaft 19 immediately below the upper heat exchange element 18. Above this, a disc 28 with a scraper 29 is shown likewise secured to the shaft 19. These elements 28 and 29 serve for leading the tempered mass flowing out through the heat exchange element 18 past a ring-shaped temperature feeler 30 which is accommodated in the ring 6 and which in a known manner is connected with a valve for the control of the flow of liquid to the inlet 14. A similar temperature feeler 30 is shown in the ring 5, but for the sake of perspicuity the pertaining guiding disc and scraper is not shown on the drawing.

The embodiment of the apparatus according to the invention shown in Fig. 2 is almost similar to that shown in Fig. 1 with the following changes.

The lower plate 10 of the heat exchange element rests directly on the upright edge of the bottom 2, the ring 4 in Fig. 1 being omitted on account of the fact that the rotating plate 22 according to Fig. 2 is mounted above the heat exchange element which, as explained in the foregoing, results in a lower friction resistance during the rotation of the plate. Furthermore, the tubes 12 in Fig. 2 are conical with the largest passage area above, and the wall 13 is shown without any cavity. In Fig. 2, the further possibility has been taken into consideration that one wall of the cut 25 in the plate 22 can function as a scraper for leading the tempered mass in a quantity desired out to the temperature feeler 30.

When the apparatuses shown shall be used the shaft 19 is started rotating, and the mass is led to the inlet 7 under a suitable pressure. During each revolution of the shaft 19, the cut 25 in the lower plate 22 will, irrespective of the fact whether this plate is mounted below the heat exchange element as shown in Fig. 1 or above the latter, Fig. 2, successively open and close the passage of the mass through the individual tubes 12, and hereby the mass is given the desired stepwise or pulsating motion through these. The rate of revolution of the shaft is so adapted to the size of the cut, the pressure and consistence of the mass, and the length and passage area of the tubes that a particle of the mass located at the entrance to a tube 12, when this tube is opened for passage, cannot during the opening period for this tube reach the outlet end of the tube. The amplitude in the pulsating motion should in other words be less than the length of the tube 12 if the apparatus is to yield the best tempering of the mass.

At the inlet 7 the mass may for example have a temperature of 45° C., and this temperature should in the lower heat exchange element be reduced to for example 29° C. For this purpose a flow of cooling water is admitted through the inlet 14 to the space enclosing the tubes 12, and this flow of cooling water is in a well-known manner controlled by means of an adjusting mechanism which receives adjusting pulses in one direction or the other from the temperature feeler 30 in the ring 5.

The last step of the tempering process may consist in a heating to for example 31° C. This heating is effected in the upper heat exchanger 18 to which the desired quantity of heating water can be led controlled indirectly by means of the temperature feeler 30 in the upper ring 6. The disc or plate 26 with the cut 27 for this heat exchanger functions in exactly the same manner as the plate 22 with the cut 25 in connection with the lower heat exchanger.

It will be self-evident that the invention is not limited to the embodiments shown. There may for example, according to the tempering that is desired performed, be used more or fewer tube groups 12, and these may be rotatable in the case, while the pertaining guiding plates or partitions corresponding to the plates 22 and 26 are kept stationary. These plates may have more than a single cut for the passage of the mass as shown on the drawing. Finally must be mentioned that the heat exchange elements may be manufactured in one piece by casting instead of being constructed of plates and tubes as explained above.

I claim:

1. An apparatus for tempering confectionery masses, comprising a casing with an inlet chamber and an outlet chamber for the confectionery mass and an intermediate chamber situated between said inlet and outlet chambers, a plurality of tubes communicating at one end with said inlet chamber and at the other end with said intermediate chamber and extending through a cooling space, a second plurality of tubes communicating at one end with said intermediate chamber and at the other end with said outlet chamber and extending through a heating space, means for successively and intermittently interrupting the mass flow through said first plurality of tubes, means for successively and intermittently interrupting the mass flow through said second plurality of tubes, and means for controlling the temperature in each of said cooling and heating spaces in dependence on the temperature of the mass leaving the first and the second plurality of tubes, respectively.

2. An apparatus for tempering confectionery masses, comprising a cylindrical casing including in succession a mass receiving inlet chamber at one end of said casing, a cooling space traversed by a plurality of axially extending tubes communicating at one end with said inlet chamber, an intermediate chamber communicating with the other end of said tubes, a heating space traversed by a second plurality of axially extending tubes communicating at one end with said intermediate chamber, and an outlet chamber at the other end of said casing and communicating with the other end of said second plurality of tubes, a rotary shaft extending axially through said casing and carrying a first apertured disc for successively and intermittently obstructing one end of the tubes of said first plurality of tubes and a second apertured disc for successively and intermittently obstructing one end of the tubes of said second plurality of tubes, means for controlling the capacity of cooling and heating medium admitted to said cooling and heating spaces respectively, temperature responsive means provided in said intermediate and outlet chambers and operatively connected with said control means, and guide means in said intermediate and outlet chambers to cause the mass flowing through said chambers to contact said temperature responsive means.

References Cited in the file of this patent

UNITED STATES PATENTS

| | | |
|---|---|---|
| 1,645,742 | Fee, Jr., et al. | Oct. 18, 1927 |
| 1,858,508 | Kignell et al. | May 17, 1932 |